Oct. 10, 1950 — T. H. CLARK — 2,524,768
RADIO DIRECTION FINDER
Filed Dec. 16, 1944 — 3 Sheets-Sheet 2

INVENTOR.
TREVOR H. CLARK
BY
R. P. Morris
ATTORNEY

Oct. 10, 1950        T. H. CLARK        2,524,768
RADIO DIRECTION FINDER
Filed Dec. 16, 1944        3 Sheets-Sheet 3
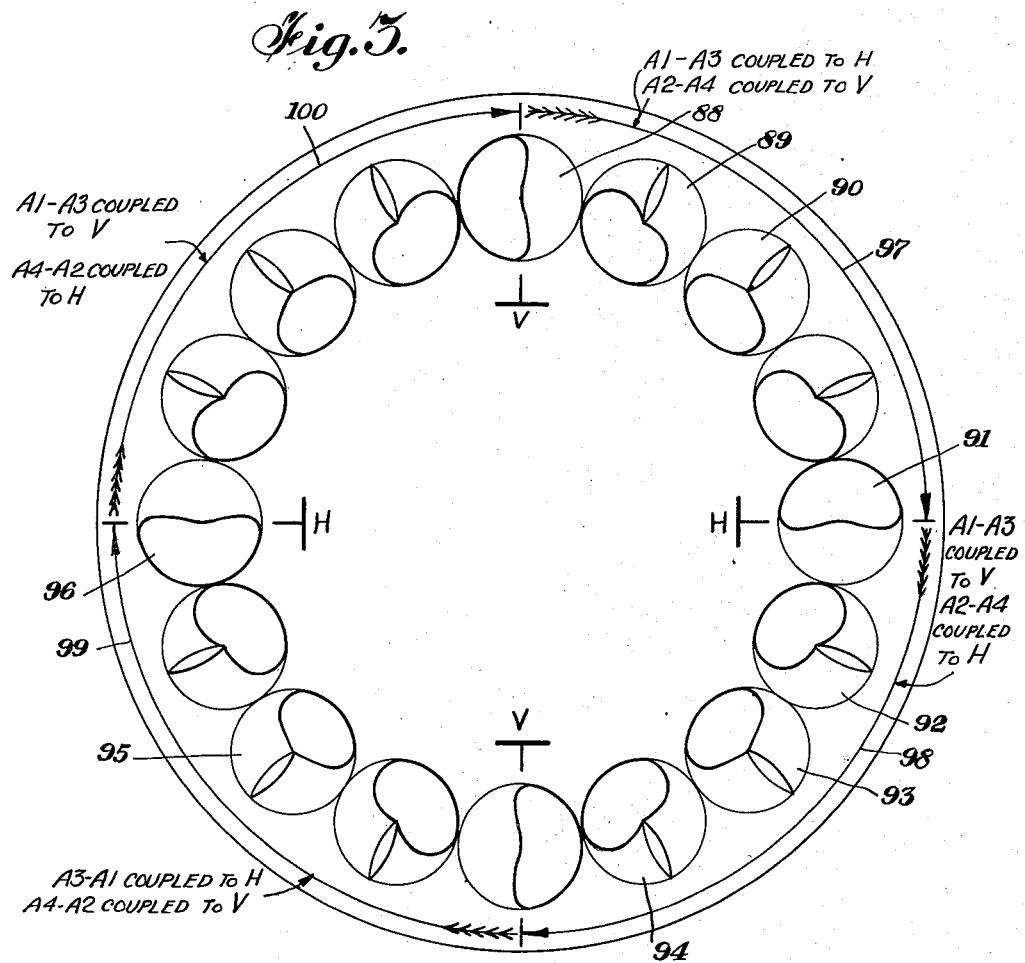
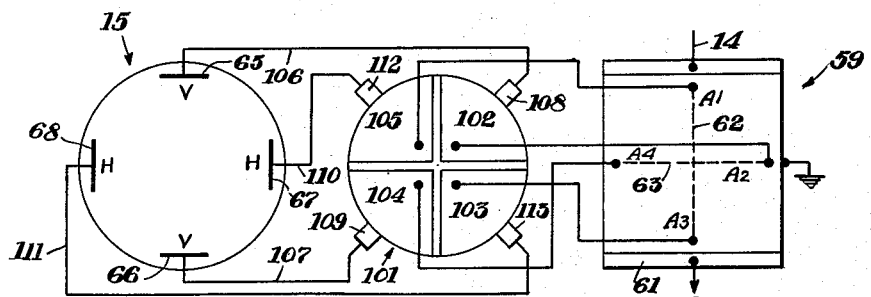
INVENTOR.
TREVOR H. CLARK
BY
R. F. Morris
ATTORNEY Patented Oct. 10, 1950

2,524,768

UNITED STATES PATENT OFFICE 2,524,768

RADIO DIRECTION FINDER

Trevor H. Clark, New York, N. Y., assignor to Federal Telephone and Radio Corporation, New York, N. Y., a corporation of Delaware Application December 16, 1944, Serial No. 568,461

10 Claims. (Cl. 343—120)

This invention relates to radio direction finders and more particularly to radio direction finders of the amplitude comparison type.

In radio direction finders of the amplitude comparison type, an indicator is used to produce directional indications dependent upon the amplitude of signals received on two or more directive antennas from a transmitting source, the direction of which is to be determined. A simple form of amplitude comparison, direction finder indicator is of the type wherein crossed loop antennas are arranged for alternate coupling to an instrument so that the energy received in the two loops may be directly compared. It is, however, desirable in many installations to provide separate antennas for receiving energy from different directions, the antennas being shielded from one another. Such systems are particularly desirable on board ships or aircraft in which the metal structures of the craft themselves may tend to produce errors in directional indications in the normal type of direction finder. When a plurality of such antennas are arranged to cover separate sectors of an arc, the directional indications normally are substantially the same within each sector covered by two of the antennas. Accordingly, the sense of direction is not clearly indicated. For example, in the case of four antennas similar indications would occur in each of four quadrants.

It is an object of my invention to provide a direction finder of the type wherein a plurality of separate unidirectional receiving antenna collectors are used in a direction finder circuit to produce amplitude comparison directional indications and in which means is provided to indicate the sense of the direction within each of the sectors defined by the adjacent antennas.

It is a further object of my invention to provide an amplitude comparison indicator of the type defined above using an oscilloscope indicator.

It is a further object of my invention to provide an amplitude comparison indicator of the type outlined above using an oscilloscope indicator provided with switching circuits to assure that the directional indications are produced on the oscilloscope screen in positions corresponding to the angular directional positions of the transmitter from which energy is received.

According to a feature of my invention, a plurality of unidirectional antennas are provided, each of these antennas having such a directive pattern that the directive patterns of adjacent antennas overlap, but those of alternate antennas are mutually exclusive. As a consequence, the adajcent antennas of the system provide sectors within which the direction toward an object may be obtained by amplitude comparison. Further means is provided sequentially to couple the antennas to the direction finding receiver arrangement so that the entire arc defined by the set of antennas will be scanned at the predetermined rate. The coupling means for each of the antennas is adjusted to provide coupling during the period corresponding to the scanning of the sector covered by the directive pattern of the particular antenna.

Alternate quadrantal antennas may be coupled together to the receiving equipment since the reception patterns of these alternate antennas are mutually exclusive. Preferably a chopping circuit is provided in the coupling means to alternately couple the alternate antennas to the receiver. The output from the adjacent antennas is then applied to an amplitude comparison indicator to provide a directional indication. The indicator is also provided with a sweep circuit which will sweep an indicating beam about a circle in synchronism with the successive coupling of the antennas. The incoming signals produce a radial deflection of the beam, the radial deflection becoming zero when signals from adjacent antennas are equal. Accordingly, on the face of the indicator will be provided an indication pointing toward any station from which energy is being received. It will be clear that in order for the indications to traverse the indicator in the same direction around the entire arc covered by the antennas, it will be necessary effectively to switch the coupling of the antennas to this indicator in timed relation with the coupling of the antennas or to provide an equivalent control of the indicator sweep. This switching should be timed to correspond to the sectors defined by the overlapping patterns of two adjacent antennas.

A better understanding of my invention and the objects and features thereof may be had by reference to the particular description of an embodiment thereof made with reference to the accompanying drawings, in which:

Fig. 3 is a diagram indicating the patterns produced in different quadrants of the direction finder of Fig. 1; and Fig. 4 is a diagram of a modification to Fig. 1 to produce the results indicated in Fig. 3.

Figure 1:
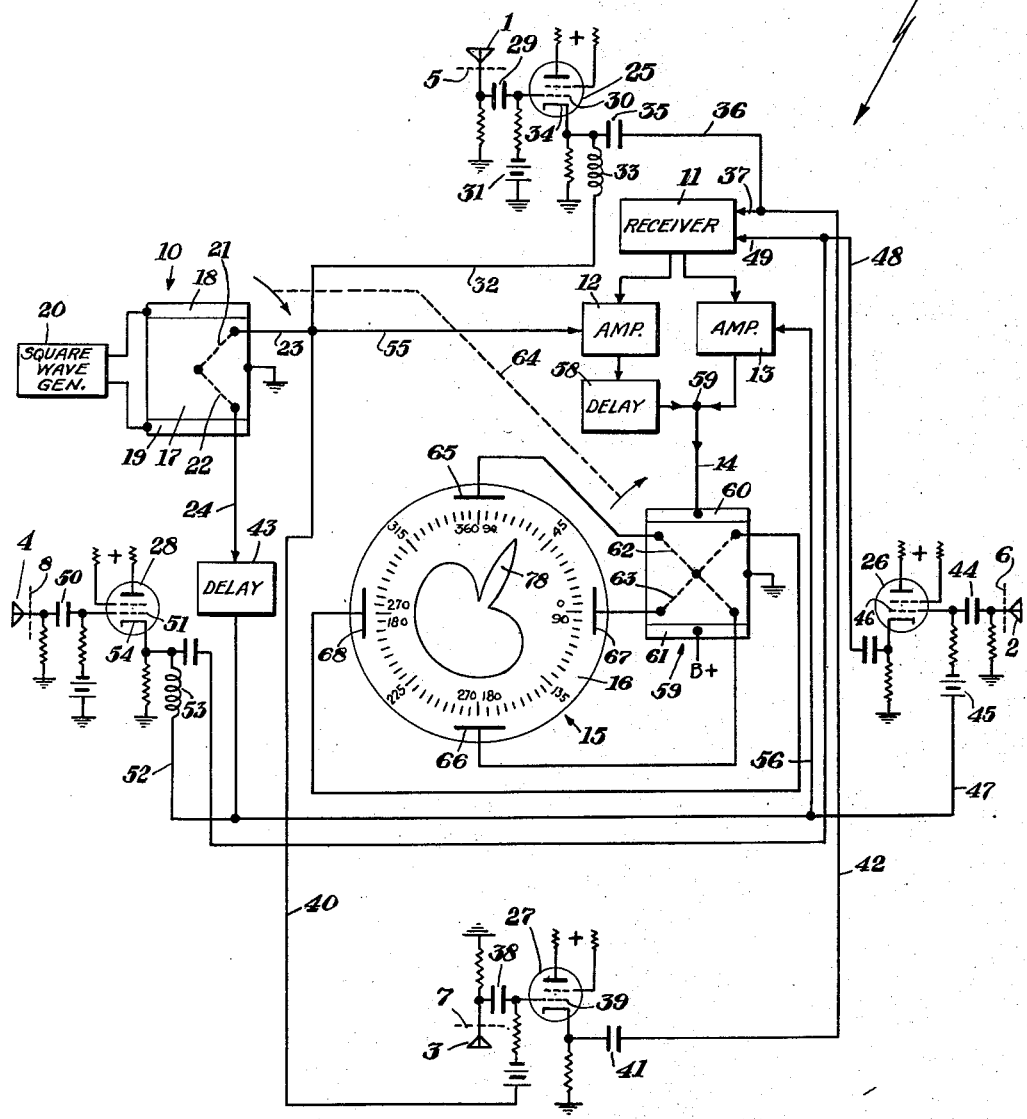
Fig. 1 is a schematic circuit diagram of a direction finder incorporating the features of my invention.
Figure 2:
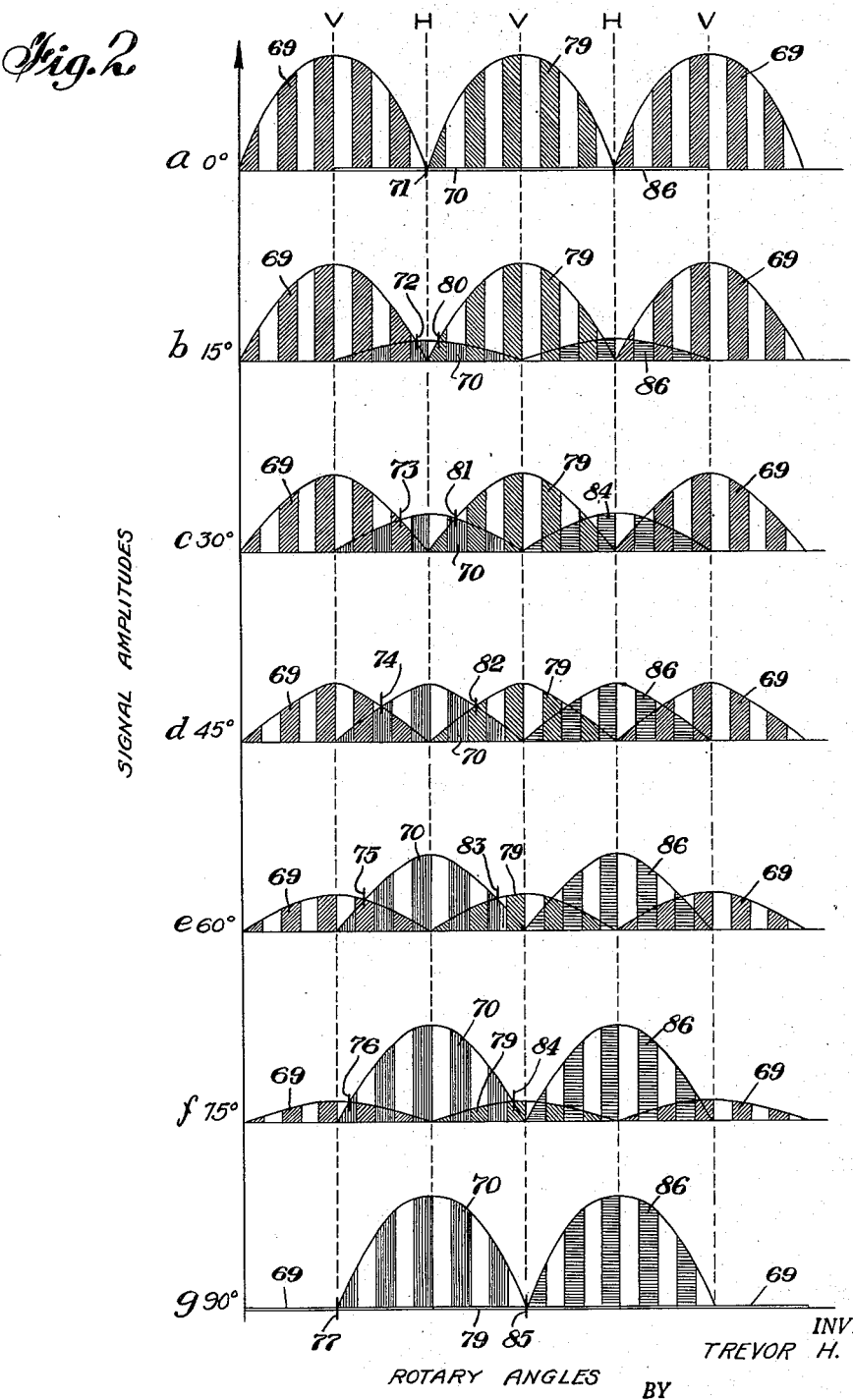
Fig. 2 is a graphical representation of the switching cycle of the direction finder of Fig. 1.

Turning first to Figs. 1 and 2 of the drawings, four antennas are shown, 1, 2, 3 and 4, each antenna being unidirectional and shielded from the other antennas as indicated by the dotted line shields shown at 5, 6, 7 and 8. The pattern from each of these antennas is preferably substantially circular and tangent to the respective reflectors so that the patterns of adjacent antennas such as 1—2, 2—3, 3—4, and 4—1 will overlap but the patterns of alternate antennas such as 1 relative to 3 and 2 relative to 4, are mutually exclusive. Thus, energy incoming from a given direction, as indicated at 9 for example, will be effective on only two of these antennas, for example antennas 1 and 2, and will not be effective on the other antennas. Furthermore, while I have shown four antennas in the illustrative embodiment, any number of antennas may be provided so long as the patterns of alternate antennas do not overlap while those of adjacent antennas do.

The switching circuit or generator 10 is provided for alternately coupling antennas 1 and 3 and 2 and 4 to a receiver circuit 11. The output of receiver 11 is applied through separate amplifiers 12 and 13 and line 14 to an indicator shown generally at 15. This indicator is preferably in the form of an oscilloscope as shown. The beam of the oscilloscope is swept around the screen 16 thereof in synchronism with the switching operation performed by switching circuit 10 so that the position of the beam on the screen will correspond in angular relationship to the angles about the direction finder.

Switching or antenna coupling circuit 10 may comprise any desired form of switching wave generator but as shown in the drawing, the generator includes the resistance block 17 similar to that described in more detail in my copending application, Serial No. 526,290, filed March 13, 1944, Patent No. 2,402,603, granted June 25 1946. A pair of conductors 18 and 19 are connected to opposite sides of block 17 and are supplied with energy from a square wave or chopping generator 20. A pair of brush arms 21 and 22 are mounted in contact with the resistor plate 17. When rotation between plate 17 and arms 21, 22 occurs, the voltages between the arms 21, 22 and ground will follow generally a sine wave form and are displaced from one another in phase quadrature. The period of generator 20 is relatively short with respect to the period of a complete rotation of the arms. Since the square wave generator 20 provides a chopping action of the voltage applied between the conductors 18 and 19, these sine waves will be broken up into a plurality of small waves as can be more readily appreciated by referring generally to Fig. 2. Brushes 21 and 22 are connected to lines 23 and 24, respectively, for utilizing the voltage developed in switching generator 10 for the purposes outlined more particularly hereinafter.

Each of the antennas 1, 2, 3 and 4 is provided with a corresponding coupling tube 25, 26, 27 and 28. These tubes are chosen with substantially similar characteristics so that they will be similarly effective in their blocking action controlled by the output waves from switching generator 10 and will all produce similar amplification of energy applied thereto. Antenna 1 is coupled over a condenser 29 to control grid 30 of tube 25. Grid 30 is normally biased to cut-off by means of a biasing battery 31. Potential from switching circuit 10 is applied over line 23, line 32 and choke coil 33 to the cathode 34 of tube 1. The potential applied to this cathode 34 serves to alter the bias of grid 30 relative to the cathode. Thus when the potential applied is negative, the bias of battery 31 will be overcome so that the tube will be conductive, and output energy from antenna 1 will be coupled over condenser 35 and lines 36 and 37 to the input of receiver 11.

The antenna 3 which is the alternate antenna to antenna 1 is coupled similarly through a condenser 38 to the control electrode 39 of tube 27. Grid 39 is also negatively biased and is connected in series through line 40 to line 23. As a consequence, negative voltage applied to the grid of tube 27 will have no effect on unblocking the tube but positive potential applied thereto will tend to neutralize the negative bias so that antenna 3 will be coupled through condenser 41, line 42 and line 37 to the input of receiver 11. Because of the square wave generator voltage applied across conductors 18 and 19, it will be seen that antennas 1 and 3 may be coupled over the same line 37 to receiver 11. Since these antennas will normally never simultaneously receive energy from the same source, they may be interconnected in the manner shown without difficulty.

Antennas 2 and 4 are similarly coupled over tubes 26 and 28 to the transmission line 24, coupled to brush 22. Because of the right angular relationship of brushes 21 and 22, it will be clear that the voltage in line 24 will be in phase quadrature to the voltage in line 23. As will be seen from the subsequent description, the voltages from antennas 2 and 4 are applied to receiver 11, during the intervals between the pulses from antennas 1 and 3.

Antenna 2 is coupled through a condenser 44 to a grid 46 of the tube 26. Grid 46 is maintained negatively biased by battery 45 and is coupled over lines 47 and 24 to brush 22. As a consequence positive voltage will serve to unblock tube 26 permitting energy from antenna 2 to be applied over lines 48 and 49 to the input of receiver 11.

Antenna 4 is coupled over condenser 50 to control grid 51 of tube 28. The grid of this tube is likewise biased to cut-off. The output from brush 22 of generator 10, however, is applied over line 52 and choke coil 53 to cathode 54 of tube 28 so that the tube is unblocked only by the application of negative potential thereto. It will thus be seen that as generator 10 operates to produce the sine wave switching voltages, antennas 1, 2, 3 and 4 will be sequentially coupled to receiver 11. In the output of receiver 11 the two amplifiers 12 and 13 are arranged to be unblocked alternately at the rate of the waves from generator 20 by voltages from brushes 21 and 22 over lines 23 and 55 and 24 and 56, respectively. If necessary, depending upon the relative frequencies of the waves from generator 20 and generator 10, a delay means 43 may be provided, which serves to shift the energy in line 24, one-half the period of the square waves from generator 10, to assure that these voltages will be applied to the receiver 11 during the interval between the voltages applied to the receiver through line 37. Thus output from one antenna passes through the receiver at a time; first the antenna outputs 1 and 2 are alternately passed through the receiver at the relative fast rate of the waves from 20 then 2 and 3, 3 and 4, 4 and 1, the groups 1 and 2, 2 and 3, 3 and 4, 4 and 1, being switched at the relatively slower rate of the waves from generator 19.

The output energy from amplifiers 12 and 13 is combined in phase opposition at juncture 59, the output from one of the amplifiers 12, for example, being delayed in delay network 58 by an amount equal to one-half of the period of the square wave switching voltage so that these outputs will be combined in phase opposition. This output voltage is then applied over line 14 to a second sine wave generator 59 which may be similar in construction to generator 10. Generator 59 comprises conducting blocks 60 and 61 and pairs of brushes 62 and 63. Generator 59 is preferably driven in synchronism with generator 19 as indicated by the dotted lines 64 so that the outputs thereof will be properly synchronized. Brushes 62 are coupled to vertical plates 65 and 66 of cathode ray indicator 15, while brushes 63 are coupled to two horizontal plates 67 and 68 of this tube. Block 61 of the generator may be coupled to the positive plate supply B+ for supplying amplifiers 12 and 13.

Turning now to Fig. 2, the operation of the system of Fig. 1 will be more fully described. As pointed out above, antennas 1, 2, 3 and 4 are sequentially coupled to the receiver circuit. However, assuming energy is incoming in the quadrant defined by antennas 1 and 2 then the voltage applied to vertical electrodes 65 and 66 will be only the output voltage from antennas 1 and 2. Thus, in this quadrant, energy indicated at 69 in antenna 1 will vary between a maximum value shown in curve $a$ to zero value as shown in curve $g$ as the direction of received energy varies from a direct line on the antenna 1 to a direct line on the antenna 2. Similarly, the energy received on antenna 2 shown at 70 will vary from a zero value in curve $a$ to a maximum value as shown in curve $g$. Since the outputs from these two antennas are combined in phase opposition, the energy will reduce to zero at successive points indicated at 71 through 77 as shown in the respective curves $a$ to $g$ of Fig. 2. Thus, on the screen of the oscillograph 15 the zero pointing indication 78 (Fig. 1) will move from zero point adjacent plate 67 counterclockwise to the 90° indicating position adjacent plate 65.

In the succeeding quadrant covered by antennas 2 and 3, the energy on antenna 2 will again vary in the manner shown by curve 70 of Fig. 2. However, the energy incoming on antenna 3 will vary in the manner shown in curve 79 of Fig. 2 from a maximum in curve $a$ to a minimum in curve $g$. The zero balance point will therefore vary as shown at 71, and 80 through 85 of Fig. 2 so that the pointing indicator 78 will tend to rotate in a clockwise direction from a position adjacent deflector 67 to a position adjacent deflector 66. Similarly, energy from antennas 3 and 4 will vary in accordance with curves 79 and 86 of Fig. 2 so that the pointer will again traverse in a counterclockwise direction starting from a point adjacent electrode 68 of Fig. 1 to a point adjacent electrode 66. In comparing the energy of antennas 1 and 4, it will be found that the pointer again moves clockwise during this quadrant as indicated by curves 86 and 69 of Fig. 2. As a consequence, the oscillograph indicator will have to be calibrated in a peculiar fashion as shown in Fig. 1 unless other provisions are made to take care of this discrepancy.

Turning to Fig. 3, there is shown a series of cathode ray indicator screens 88, through 96 illustrating the variation in the pointer indications following clockwise around the phase of the indicator dial for the various angles of reception. This result may be accomplished by coupling antennas 1 and 3 across the horizontal plates and antennas 2 and 4 across the vertical plates for the first quadrant indicated at 97, Fig. 3; coupling antennas 1 and 3 across the vertical deflectors and antennas 2 and 4 across the horizontal deflectors for the quadrant 98; coupling 3 and 1 across the horizontal electrodes and antennas 4 and 2 coupled across the vertical electrodes for quadrant 99, and coupling antennas 1 and 3 across the vertical and antennas 4 and 2 across the horizontal electrodes for quadrant 100.

To accomplish this result, a switching disc may be added to the circuit arrangement of Fig. 1 as indicated in the diagram of Fig. 4. This switching arrangement may comprise a commutator disc 101 having four sectors 102, 103, 104 and 105. The opposite ends of brush arm 62 are coupled permanently to sectors 103 and 105 while the opposite ends of arm 63 are coupled permanently to sectors 102 and 104. Vertical deflector electrodes 65, 66 are coupled over lines 106, 107, respectively, to brushes 108, 109. Similarly, horizontal deflecting electrodes 67, 68 are coupled over lines 110, 111 to brushes 112, 113. Relative rotation between disc 101 and brushes 110 to 113 is produced synchronously with rotary generators 10 and 59 of Fig. 1 so that the connections to vertical plates 65, 66 and horizontal plates 67, 68 are alternately coupled to brush arms 62 and 63 of generator 59. Thus, a shift in position of the normal beam pattern occurs on each successive quadrant of the indicator 15. Because of this switching arrangement then the pointer may be made to traverse clockwise around the dial in accordance with the various directions of reception at a substantially uniform rate.

It is clear that the same effect may be obtained by other means, such as switching the antenna inputs if desired instead of switching at the indicator. However, the switching circuit in the indicator is substantially simpler than the variation in coupling on the switching arrangement that would be necessary in the output of the receiver to accomplish a similar result.

It should be clear that while I have described particular types of voltage generators to control the various switching operations, any suitable switching wave generators may be used for this purpose. Likewise, any desired type of chopper or square wave circuit may be used to effect the switching operation if this is also considered desirable. Moreover, the circuit may be used as a direction finder without the square wave chopping effect. It should be understood that the speed of rotation of the various generator arrangements is not material to the operation of the circuit but should be sufficiently high so that a persistent vision on the cathode ray screen will be obtained. Moreover, for rapidly moving objects it is desirable that the direction finder operate at a higher rate of speed than is necessary with relatively slow moving objects.

It should be distinctly understood that the specific examples of my invention described above in connection with a particular circuit are given merely by way of example and should not be

I claim:

1. A direction finder comprising four unidirectional antennas arranged to receive energy over directive patterns such that patterns of alternate antennas are mutually exclusive, an indicator circuit, a receiver, means for alternately coupling the first and third of said antennas to said receiver at a slow rate, means for alternately coupling the second and fourth of said antennas to said receiver at said slow rate, means for sequentially rendering the coupling means for said antennas effective at a rapid rate so that energy received on an odd numbered and an even numbered antenna is successively applied to said receiver and means for comparing pairs of successively received energies to determine the direction of the source of received energy.

2. A direction finder comprising a plurality of sets of unidirectional antennas positioned to receive energy over directive patterns such that patterns of alternate antennas are mutually exclusive, a receiver, separate normally ineffective means for alternately coupling at a slow rate the antennas of one set of alternate antennas to said receiver, separate means for alternately coupling at said slow rate the antennas of the other set of alternate antennas to said receiver, means for successively rendering said separate means effective at a rapid rate so that energy from one antenna at a time is applied to said receiver, means for combining in phase opposition pairs of successively received energies to obtain resultant outputs thereof, an oscilloscope indicator having deflector means for moving the beam of said oscilloscope in two coordinates, means for producing a rotation of said beam at said slow rate and means for modulating said beam rotation with said resultant outputs to produce an indication of the direction of the source of received signals.

3. A direction finder comprising a plurality of sets of unidirectional antennas positioned to receive energy over directive patterns such that patterns of alternate antennas are mutually exclusive, a receiver, separate normally ineffective means for coupling the antennas of one set of alternate antennas to said receiver at a low frequency and separate normally ineffective means for coupling the antennas of the other set of alternate antennas to said receiver at said low frequency, means for successively rendering said separate means effective at a high frequency so that energy from one antenna at a time is applied to said receiver, means for combining in phase opposition pairs of successively received energies to obtain resultant outputs thereof, an oscilloscope indicator having two pairs of angularly disposed deflector means, a source of two low frequency waves phase displaced 90° from each other, means for separately modulating said last named waves with said resultant outputs, means for applying said last named modulated outputs to separate deflector means for producing an indication of the direction of source of received signals.

4. A direction finder of the type wherein a direction line between the director finder and a transmitting station is indicated within a given sector of an arc comprising a plurality of sectors in response to energy transmitted from said station and received by directive antennas located substantially at the boundaries of said sectors, the directive patterns of each antenna overlapping only a portion of the directive patterns of the next adjacent antenna, a receiver, means for combining the energy received by different groups of said antennae to provide separate combined outputs corresponding to the number of sectors in said arc, each of said combined outputs comprising alternate samplings of the energy received by the antenna comprising a group, means for applying said combined outputs sequentially at a given rate to said receiver, means for comparing the amplitude of successive pairs of samplings of each group in said receiver output to obtain compared outputs corresponding to each group, an indicator, means for applying each of said compared outputs to said indicator for indicating from which sector the energy is received.

5. A direction finder of the type wherein a direction line to a transmitting station is obtained from energy transmitted from said station and received by adjacent antennas of a plurality of directive antennas, the directive patterns of alternate antennas being mutually exclusive whereby the received energy in any adjacent antennas define a predetermined sector in an arc defined by the directive patterns, comprising a receiver, a source of high frequency switching signals, a source of low frequency switching signals, means for modulating said high frequency signals with said low frequency signals to obtain resultant switching signals of different phase, means for modulating one mutually exclusive pair of antenna outputs in phase opposition with said resultant signals of one phase and means for modulating another mutually exclusive pair of antenna outputs in phase opposition with said resultant signals of a phase different from said one phase, means for applying said modulated waves to said receiver comprising means for phasing said modulated waves whereby each antenna output is passed separately through said receiver, means for combining the antenna outputs corresponding to a successively received pair of antenna outputs, an indicator, means for applying said combined outputs to said indicator for comparing the amplitudes thereof.

6. An arrangement according to claim 5, wherein said combined outputs are compared for a full low frequency cycle of modulation.

7. An arrangement according to claim 6, wherein said antennas comprise four quadrature spaced antennas, said resultant switching signals comprising waves phase displaced 90° at said low frequency.

8. An arrangement according to claim 7, wherein said indicator comprises a cathode ray tube having deflection means, a source of two low frequency waves phased displaced 90° from one another, means for modulating said combined outputs with separate ones of said last named waves to obtain separate outputs, means for applying said separate outputs to separate deflection means for indicating from which sector the energy is received.

9. A direction finder of the type wherein successive comparison in amplitude is made between the energy received from a radio wave source by adjacent pairs of uni-directional antennas, a plurality of said antennas being positioned to receive energy from substantially all directions about said direction finder, a receiver, means for selecting a pair of antennas, means for alternately applying at a relatively rapid rate the antenna outputs of a selected antenna pair to said receiver, means for cyclically varying the antenna pairs selected at a relatively slow rate, means for comparing the receiver outputs corresponding to successively received pair of antenna outputs to obtain a resultant output thereof, indicator means, means for applying said resultant outputs successively to said indicator.

10. An arrangement according to claim 9, wherein said means for comparing comprises means for combining the antenna outputs in phase opposition.

TREVOR H. CLARK.

REFERENCES CITED

The following references are of record in the file of this patent:

UNITED STATES PATENTS

| Number | Name | Date |
| --- | --- | --- |
| 1,741,282 | Busignies | Dec. 31, 1929 |
| 2,204,206 | Brunner | June 11, 1940 |
| 2,213,273 | Earp | Sept. 3, 1940 |
| 2,213,874 | Wagstaffe | Sept. 3, 1940 |
| 2,214,342 | Neufeld | Sept. 10, 1940 |
| 2,392,420 | Steinhoff | Jan. 8, 1946 |
| 2,408,039 | Busignies | Sept. 24, 1946 |

FOREIGN PATENTS

| Number | Country | Date |
| --- | --- | --- |
| 526,658 | Great Britain | Apr. 29, 1937 |